: # 3,121,005
PROCESS FOR DETINNING

Leonard M. Edwards, Cranford, and Hartmut W. Richter, Plainfield, N.J., assignors, by mesne assignments, to M & T Chemicals Inc., New York, N.Y., a corporation of Delaware
No Drawing. Filed Mar. 13, 1961, Ser. No. 94,973
7 Claims. (Cl. 75—98)

This invention relates to a novel process for detinning. More specifically, it relates to a detinning process characterized by low cost, high efficiency, and high speed.

As is well known, steel is often used in the form of a sheet which is coated with a layer of tin. This tin plate is commonly fabricated into various containers, typically so-called tin cans. The by-product scrap from this and other similar operations contains such a high content of tin that it cannot economically be discarded. Furthermore, the steel contained in the scrap cannot commercially be reclaimed without treatment thereof to remove the adhering coating of tin because the tin embrittles the steel upon remelting.

Accordingly, it has been common to subject tin plate scrap to a detinning operation wherein the tin may be recovered. Commonly, this is done by chemical treating which permits the recovery of steel containing little or no tin, and simultaneously the recovery of tin, usually in the form of a solution of a tin chemical e.g. sodium stannate.

Although recovery of tin by various detinning operations has been effected for many years, the operation is less than wholly satisfactory. It is a particular feature of prior art commercial techniques that recovery of scrap containing the desired low content of tin (typically 0.035%–0.06%) requires an undesirably long period of time, often as much as 4 hours.

It is an object of this invention to provide a process for recovering tin and usable steel scrap from tin plate scrap. Another object of this invention is to provide a technique of detinning which is characterized by its high speed and high efficacy. Other objects will be apparent to those skilled in the art upon inspection of the following description.

In accordance with certain aspects of this invention, it is possible to recover tin from tin plate by the process which comprises maintaining tin plate in contact with an aqueous solution containing a soluble caustic and a soluble thiosulfate for a period of time sufficient to dissolve the tin and to leave behind a detinned steel sheet in the aqueous solution, and separating the detinned sheet from said solution.

The raw material, tin-coated metal, which may be treated in accordance with this invention, is that commonly known as tin plate, formed by depositing a thin layer of tin on a basis or substrate of steel. Commonly the amount of tin deposited on the steel is about 0.25%–1.55% by weight. Although other tin-coated metals from various sources may be treated by the process of the instant invention, this invention particularly finds use in connection with the recovery of tin from scrap tin plate with resulting production of detinned steel scrap sufficiently free of tin so that it may be resmelted.

In accordance with the practice of this invention, the raw material, preferably scrap tin plate, in various shapes and sides is maintained in contact with an aqueous solution of a soluble caustic and a soluble thiosulfate, preferably sodium thiosulfate, $Na_2S_2O_3$. When the thiosulfate is available as the solid crystalline material, e.g. $Na_2S_2O_3 \cdot 5H_2O$, it will be placed in solution of the desired concentrations as hereinafter set forth in greater detail.

Detinning agents equivalent to the sodium thiosulfate may also be employed. Typically, such a detinning agent may be formed by heating a solution of sodium sulfite with sulfur. Other equivalent materials which may be employed to practice the instant invention include, for example, soluble alkali metal thiosulfates, typically ammonium thiosulfate, potassium thiosulfate, etc., or soluble thiosulfates of alkaline earth metals, typically calcium thiosulfate, strontium thiosulfate, etc. Other materials which may be equivalent to the preferred sodium thiosulfate will be well known to those skilled in the art.

In the preferred embodiment, the solution which may be employed to treat the tin plate scrap will preferably contain sodium thiosulfate in concentrations of 25 g./l. (grams per liter) to 300 g./l., preferably 100 g./l. Equivalent concentrations of other materials may be employed. When sodium thiosulfate is formed in situ as would be the case when it is formed by the reaction between sodium sulfite and sulfur, the concentrations of the reactants will be preferably controlled to produce the desired ultimate concentration of the thiosulfate.

Although it may be possible to operate at concentrations outside the indicated range, it will be found that the advantages of this invention will not be fully realized; for example, as the concentration falls appreciably below the preferred lower limit, the time of the detinning reaction may increase disproportionately. As the concentration increases appreciably above the preferred upper limit, the drag-out (i.e. the amount of the solution ultimately removed with the steel from the bath because of the increased viscosity and surface tension of the solution) increases appreciably. Furthermore, as pointed out in detail infra, the quantum of improvement may decrease as the amount of thiosulfate increases appreciably above the noted upper limit.

In practice of this invention, the solution will contain a soluble caustic, preferably sodium hydroxide, potassium hydroxide, or other equivalent caustic materials. Preferably the caustic will be sodium hydroxide present in amounts of 25 g./l. to 200 g./l., preferably 100 g./l. to 150 g./l., say 100 g./l. Equivalent amounts of other soluble caustic materials may be employed.

It is a feature of this invention that detinning may be effected extremely rapidly by the use of the preferred detinning bath of thiosulfate and caustic. Preferably the amount of caustic which may be present will be sufficient to raise the pH to at least about 13.5, and in the preferred embodiment, the pH of the solution may approach 14. Typical experiments indicating the ease of detinning when various concentrations of caustic are employed may be noted from Table I, hereinafter set forth. In this table, each solution contained the indicated amounts of sodium thiosulfate and sodium hydroxide. The solution was maintained in contact with tin scrap (containing 0.55% tin) for the indicated times of treatment at 95° C., at which times detinning was completed unless otherwise noted.

TABLE I

| g./l. sodium thiosulfate | g./l. sodium hydroxide | Time (minutes) |
|---|---|---|
| 0 | 200 | (1) |
| 25 | 10 | 63 |
| 25 | 25 | 46 |
| 25 | 50 | 27 |
| 25 | 100 | 16 |
| 25 | 200 | 10 |
| 50 | 10 | 40 |
| 50 | 25 | 23 |
| 50 | 50 | 23 |
| 50 | 100 | 15 |
| 50 | 200 | 7 |
| 100 | 10 | 26.5 |
| 100 | 25 | 15 |
| 100 | 50 | 11 |
| 100 | 100 | 5 |
| 100 | 200 | 3 |
| 200 | 10 | 5.5 |
| 200 | 25 | 8 |
| 200 | 50 | 3 |
| 200 | 100 | 2.5 |
| 200 | 200 | 1.5 |
| 300 | 0 | (2) |
| 300 | 10 | 4.5 |
| 300 | 25 | 3 |
| 300 | 50 | 2 |
| 300 | 100 | 2 |
| 300 | 200 | 1.25 |

1 Incomplete detinning after 3 hours.
2 No detinning after 60 minutes.

From the foregoing table, it will be apparent that it is preferred to employ sodium thiosulfate in concentrations of 50–200 g./l., preferably 100 g./l. Furthermore, it will be apparent that it is preferred to employ sodium hydroxide in concentrations of 25–200 g./l., more preferably 100–150 g./l., say 100 g./l.

It is a particular feature of this invention that detinning operations when conducted as herein indicated, may be effected at controlled widely varying times; and if desired, the operation may be conducted to give almost instantaneous detinning. Detinning may be effected in 5 minutes to give a highly efficient stripping, measured in terms of the amount of plate removed in the noted time. Commonly the process of this invention may be carried out under commercial conditions for 10–20 minutes with correspondingly decreased amount of thiosulfate and caustic materials.

It is preferred in the practice of this invention to heat the aqueous alkaline thiosulfate solution prior to contact thereof with the metal. Preferably the solution may be heated to a temperature of 75° C.–100° C., say 95° C. If desired, heating may be effected to maintain the solution as close to its boiling point as practically possible during its use in the actual detinning operation.

The detinning operation may be effected by contacting the heated solution, preferably at temperature of 75° C. to 100° C., say 95° C. with the tin scrap which may typically be at ambient or room temperature of 15° C. to 25° C. During the detinning, the solution will preferably be maintained in the preferred temperature range of 75° C. to 100° C., say 95° C.

When a large detinning plant is being run continuously, it may be desired to detin in as short a time possible—typically 5, 10, 20 minutes—which may allow for an adequate period for the various handling steps. If however the plant is a sufficiently small one so that it is not necessary to effect such speed, then it is a feature of this invention that detinning may be effected at room temperature. In one series of comparative experiments, samples of scrap tin plate were detinned with a solution containing 100 g./l. sodium hydroxide and 100 g./l. sodium thiosulfate for varying temperatures until detinning was substantially complete.

TABLE II

| Temp., ° C.: | Time (minutes) |
|---|---|
| 95 | 5 |
| 75 | 11.5 |
| 50 | 30 |
| 22 | 140 |

From this table it is apparent that detinning may be effected at room temperature (ca. 22° C.) in 140 minutes. More generally, detinning may be readily carried out in the 20° C.–40° C. range which may be achieved with application of little or no heat. Use of solutions containing sodium hydroxide alone or sodium thiosulfate alone, at these low temperatures or at higher temperatures gives substantially no detinning action.

At the end of the desired time, the detinning operation is completed and the scrap is separated from the solution by either draining the solution from the scrap or more commonly by lifting the detinned tin plate scrap from the solution.

The solution containing the tin which has been removed from the plate may be treated in the desired manner to recover tin therefrom. The solution may however preferably be reused in the manner similar to that hereinbefore described if desired, until the desired concentration of tin reaches a level at which it may be economically recovered.

In the practice of this invention according to the preferred embodiment thereof, wetting agents may be present in the detinning solution to facilitate contact thereof with the plate. Typical of such wetting agents which may be present are sodium lauryl sulfate, etc. These agents may be present in typical concentrations of 0.1 g./l. to 2 g./l., say 1 g./l. of the total solution.

The practice of this invention may be illustrated by reference to the following examples.

Example 1

In accordance with this example, 100 parts by weight of tin plate scrap containing 0.55% tin, was added to 1200 parts by weight of a solution containing 100 parts of sodium thiosulfate, 100 parts of sodium hydroxide, and 0.1 part of sodium lauryl sulfate. The solution was at a temperature of 95° C. when the tin plate scrap was added and the mixture of solution and scrap was maintained at this temperature for 5 minutes.

At the end of this time, the detinned scrap was withdrawn from the solution. Analysis showed that it contained about 0.05% tin.

Example 2

In accordance with this example, 100 parts by weight of tin plate scrap containing 0.55% tin was added to 1086 parts by weight of a solution containing 50 parts of sodium thiosulfate, 25 parts of sodium hydroxide, and 0.1 part of sodium lauryl sulfate. The solution was at a temperature of 95° C. when the tin plate scrap was added and the mixture of solution and scrap was maintained at this temperature for 25 minutes.

At the end of this time, the detinned scrap was withdrawn from the solution. Analysis showed that it contained about 0.07% tin.

Example 3

In accordance with this example, 100 parts by weight of tin plate scrap containing 0.55% tin was added to 1350 parts by weight of a solution containing 300 parts of sodium thiosulfate, 25 parts of sodium hydroxide, and 0.1 part of sodium lauryl sulfate. The solution was at a temperature of 95° C. when the tin plate scrap was added and the mixture of solution and scrap was maintained at this temperature for 3 minutes.

At the end of this time, the detinned scrap was withdrawn from the solution. Analysis showed that it contained about 0.05% tin.

Example 4

In accordance with this example, 100 parts by weight of tin plate scrap containing 0.55% tin was added to 1500 parts by weight of a solution containing 300 parts of sodium thiosulfate, 200 parts of sodium hydroxide, and 0.1 part of sodium lauryl sulfate. The solution was at a temperature of 95° C. when the tin plate scrap was added and the mixture of solution and scrap was maintained at this temperature for 1.25 minutes.

At the end of this time, the detinned scrap was withdrawn from the solution. Analysis showed that it contained about 0.06% tin.

*Example 5*

In accordance with this example, 100 parts by weight of tin plate scrap containing 0.55% tin was added to 1270 parts by weight of a solution containing 50 parts of sodium thiosulfate, 200 parts of sodium hydroxide, and 0.1 part of sodium lauryl sulfate. The solution was at a temperature of 95° C. when the tin plate scrap was added and the mixture of solution and scrap was maintained at this temperature for 7 minutes.

At the end of this time, the detinned scrap was withdrawn from the solution. Analysis showed that it contained about 0.04% tin.

*Example 6*

The procedure of Example 1 was duplicated except that the sodium lauryl sulfate was omitted from the detinning solution. At the end of 6 minutes, the detinned scrap was withdrawn from the solution. Analysis showed that it contained about 0.04% tin.

The improvement obtained by the novel detinning compositions of this invention containing caustic and thiosulfate, preferably sodium hydroxide and sodium thiosulfate, and the novel detinning baths formed by dissolving these detinning compositions in water, permit attainment of substantial improvements in the art of detinning.

Although this invention has been disclosed by reference to various specific examples, it will be apparent to those skilled in the art that various modifications and changes may be made thereto which fall within the scope of this invention.

We claim:

1. The method of recovering tin from tin plate which comprises maintaining tin plate in contact with an aqueous solution containing a soluble caustic and a soluble thiosulfate for a period of time sufficient for the tin to dissolve in the aqueous solution and to leave behind a detinned steel sheet, and separating the detinned steel sheet from said solution.

2. The method of recovering tin from tin plate as claimed in claim 1 wherein said caustic is sodium hydroxide.

3. The method of recovering tin from tin plate as claimed in claim 1 wherein said thiosulfate is sodium thiosulfate.

4. The method of recovering tin from tin plate which comprises maintaining tin plate in contact with an aqueous solution containing sodium hydroxide in amount of 25–200 grams per liter and a soluble thiosulfate for a period of time sufficient for the tin to dissolve in the aqueous solution and to leave behind a detinned steel sheet, and separating the detinned steel sheet from said solution.

5. The method of recovering tin from tin plate which comprises maintaining tin plate in contact with an aqueous solution containing caustic and sodium thiosulfate in amount of 25–300 grams per liter for a period of time sufficient for the tin to dissolve in the aqueous solution and to leave behind a detinned steel sheet, and separating the detinned steel sheet from said solution.

6. The method of recovering tin from tin plate which comprises maintaining tin plate in contact with an aqueous solution containing sodium hydroxide and sodium thiosulfate at 20° C.–40° C. for a period of time sufficient for the tin to dissolve in the aqueous solution and to leave behind a detinned steel sheet, and separating the detinned steel sheet from said solution.

7. The method of recovering tin from tin plate which comprises maintaining tin plate in contact with an aqueous solution containing 100 grams per liter of sodium hydroxide and 100 grams per liter of sodium thiosulfate for a period of time sufficient for the tin to dissolve in the aqueous solution, and to leave behind a detinned steel sheet, and separating the detinned steel sheet from said solution.

References Cited in the file of this patent

UNITED STATES PATENTS

| | | |
|---|---|---|
| 2,350,918 | Norlander | June 6, 1944 |
| 2,355,777 | Benson et al. | Aug. 15, 1944 |
| 2,772,240 | Trobeck et al. | Nov. 27, 1956 |

OTHER REFERENCES

Parkes and Mellor: "Mellor's Modern Inorganic Chemistry," Longman, Green & Co., New York, 1939, p. 443. (Copy in Office Div. 3.)